United States Patent Office 2,805,701
Patented Sept. 10, 1957

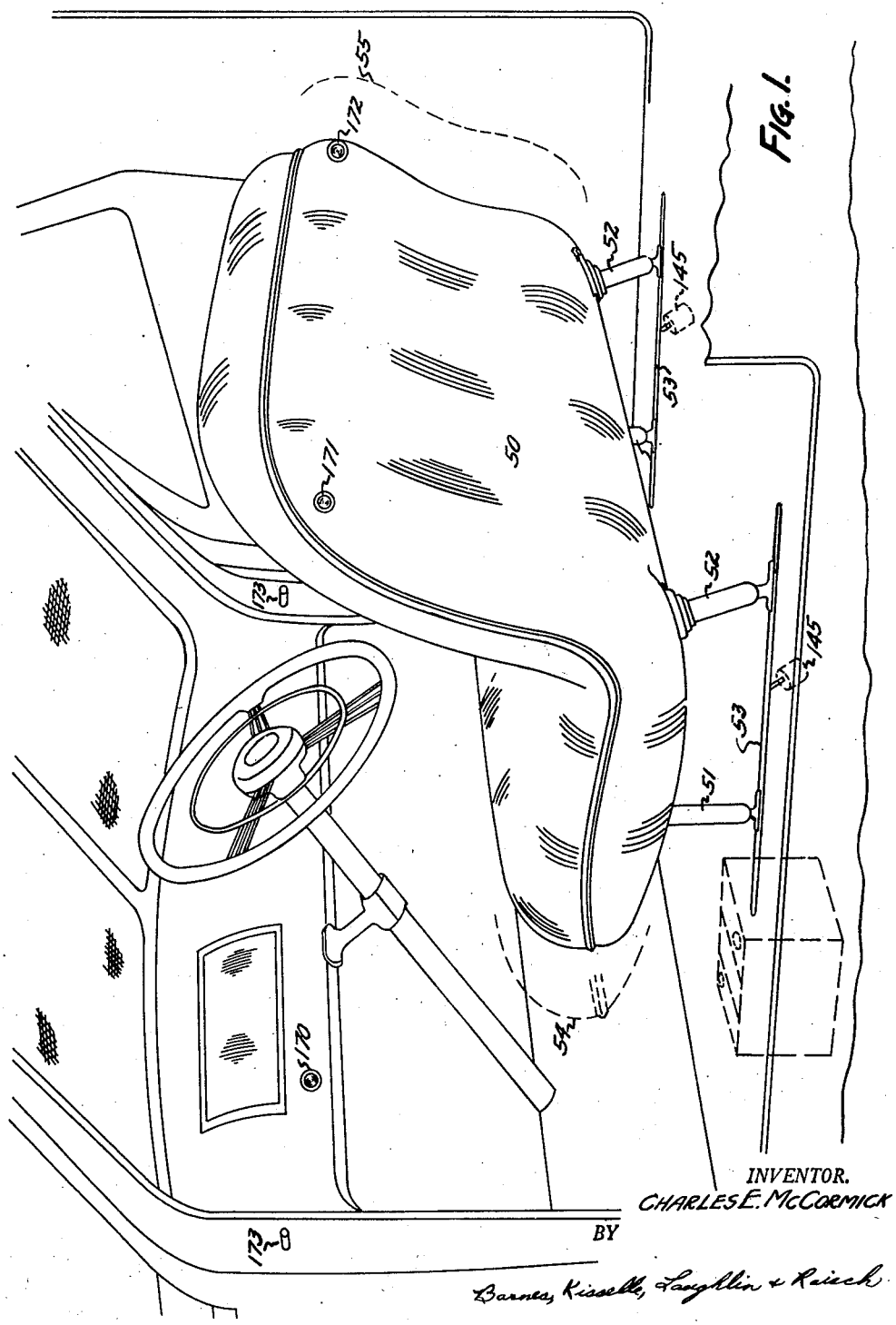

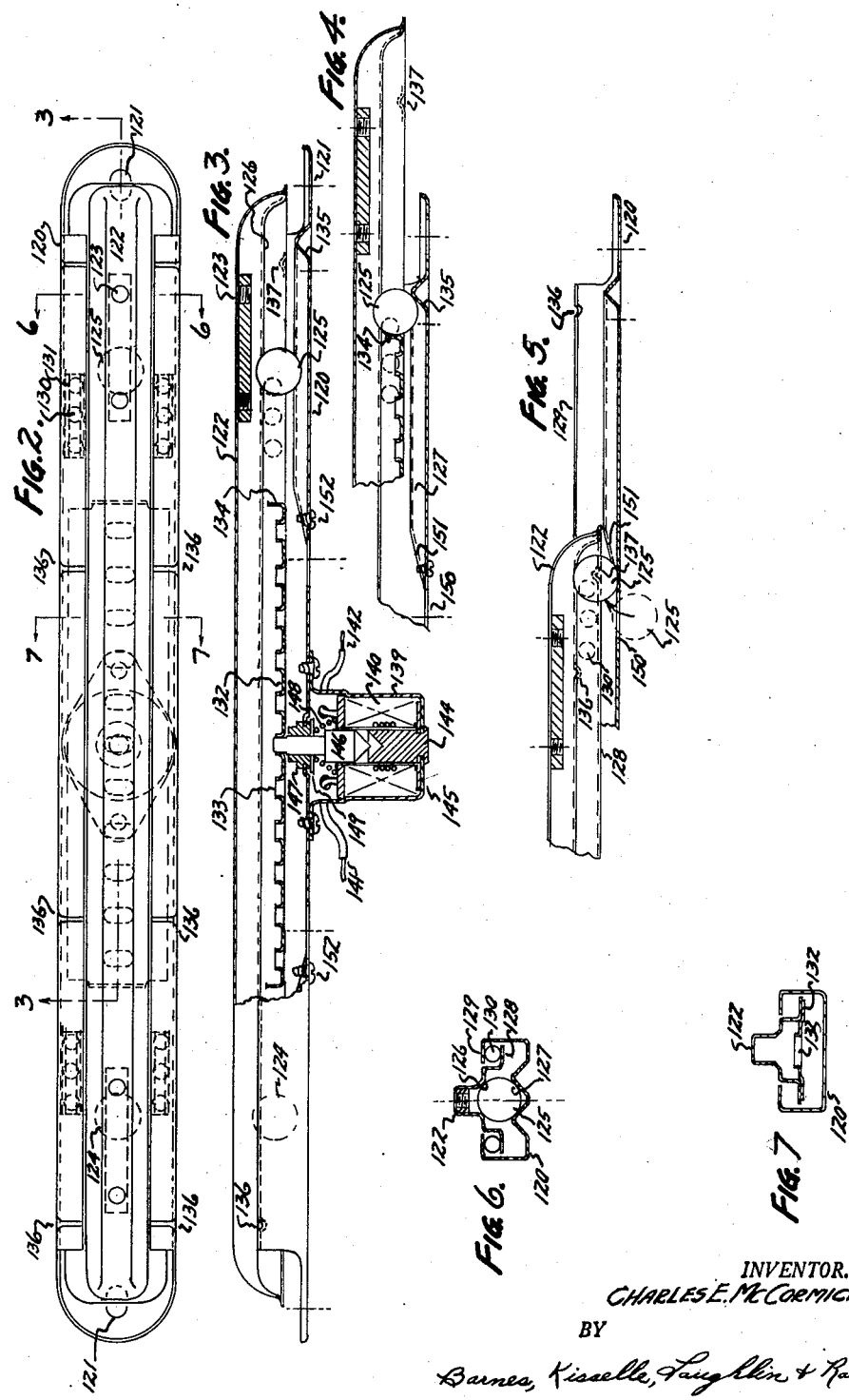

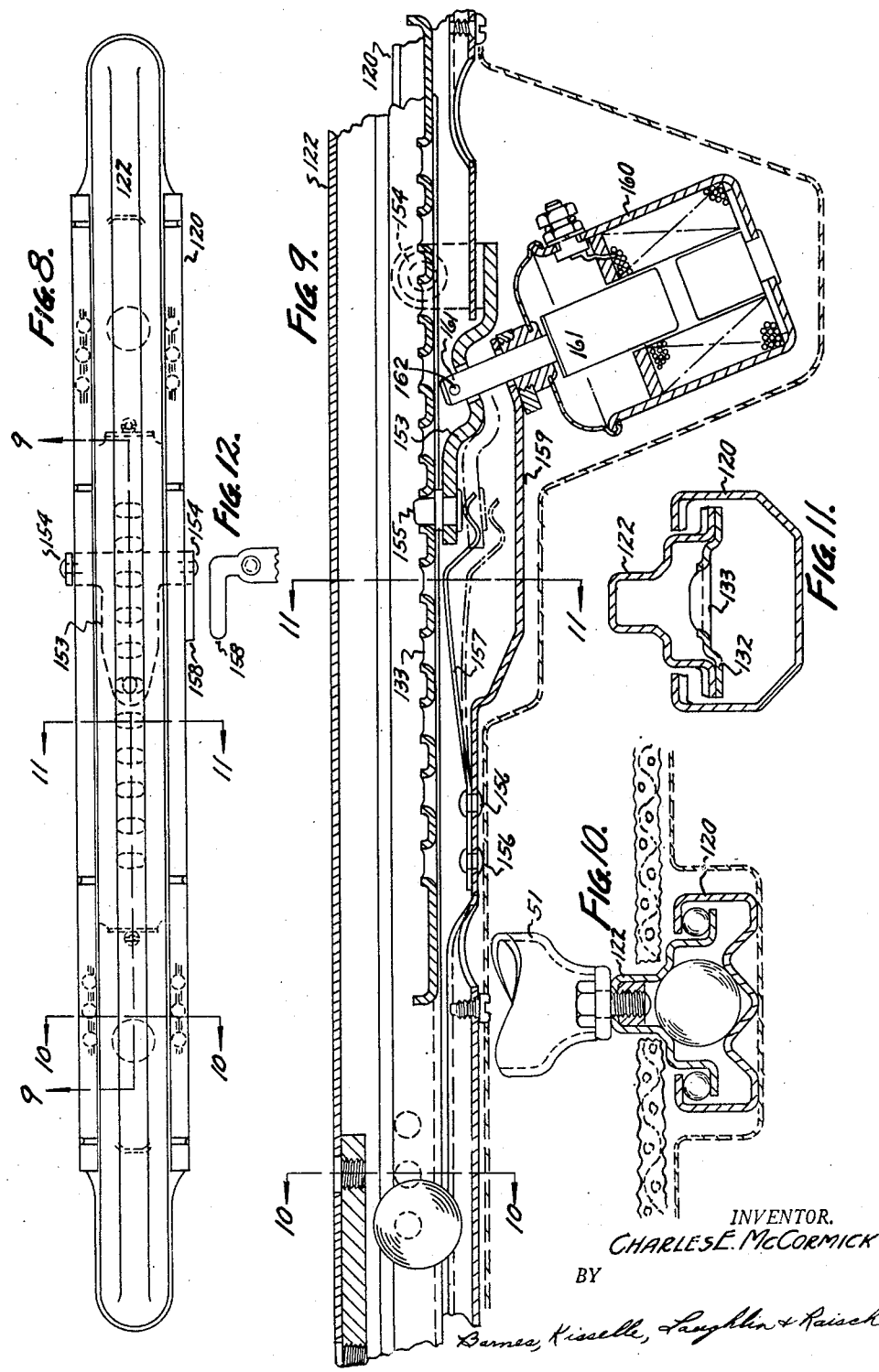

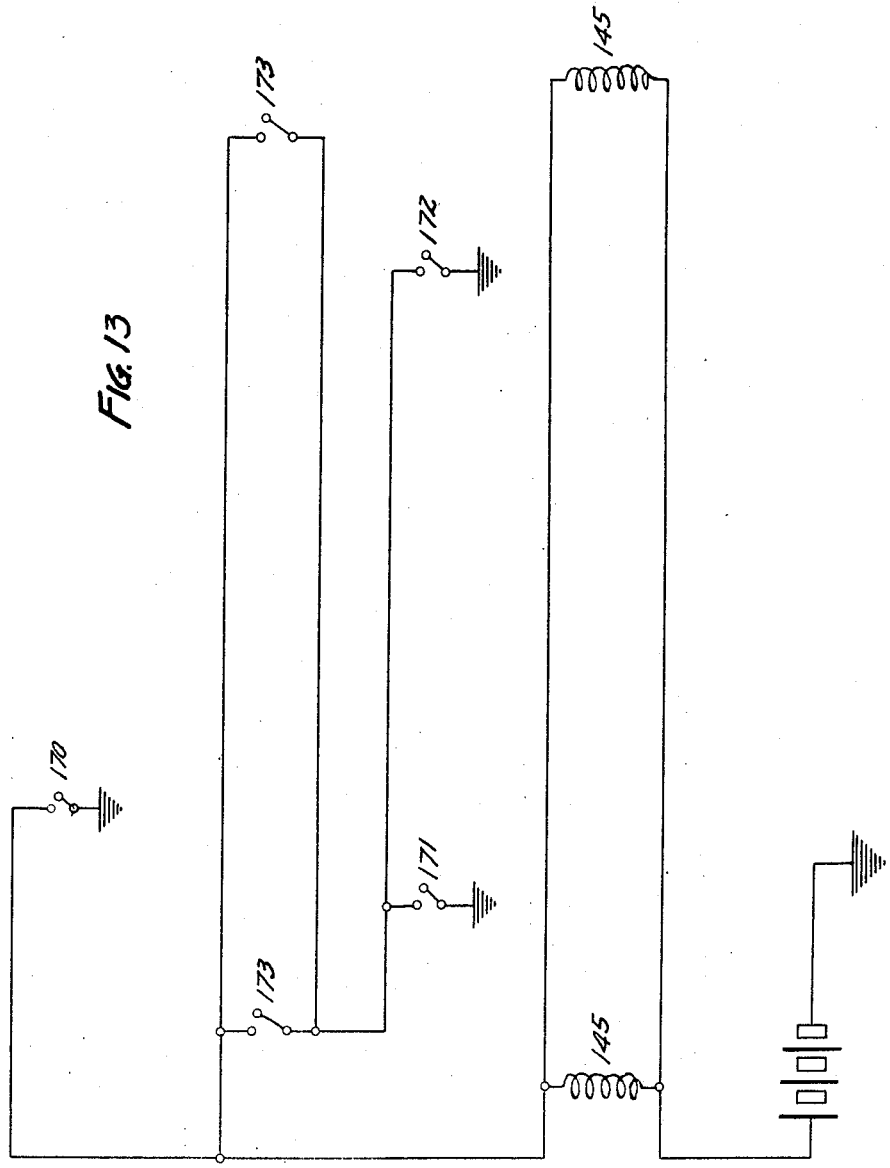

2,805,701

SEAT TRACK

Charles E. McCormick, Dearborn, Mich.

Original application October 24, 1946, Serial No. 705,390. Divided and this application May 15, 1951, Serial No. 226,425

5 Claims. (Cl. 155—14)

This invention relates to vehicle seats and more particularly to a track structure for adjustably supporting a vehicle seat.

It is an object of the invention to provide an improved adjustable support or slide structure for a vehicle seat which can be manufactured economically and which operates very smoothly with a minimum of friction.

A further object of the invention resides in the provision of electrically actuated locking means for an adjustable slide structure which functions smoothly and enables positioning of the seat with very little effort.

In the drawings:

Fig. 1 is a general perspective view of a seat supported in an automobile body by the slide structure of this invention.

Fig. 2 is a plan view of one of the adjustable sliding seat supports of this invention.

Fig. 3 is a side elevation and partial sectional view taken along lines 3—3 in Fig. 2.

Fig. 4 is a sectional view of a portion of the adjustable support in an extreme position against stop.

Fig. 5 is a sectional view of a portion of the adjustable support showing the slides in relative position for insertion of a large ball.

Fig. 6 is a sectional view taken along lines 6—6 in Fig. 2.

Fig. 7 is a sectional view taken along lines 7—7 in Fig. 2.

Fig. 8 is the plan view of another embodiment of the adjustable support of Fig. 2.

Fig. 9 is a fragmentary sectional view taken along lines 9—9 in Fig. 8.

Fig. 10 is a sectional view taken along lines 10—10 in Fig. 8.

Fig. 11 is a sectional view taken along lines 11—11 in Fig. 8.

Fig. 12 is a side elevation of the hand operated lever shown in Fig. 8.

Fig. 13 is a wiring diagram showing connections between electric solenoids, battery, control buttons and door switches.

Referring to Fig. 1 there is shown a front seat 50 of an automobile which is mounted on front and rear supports 51 and 52, respectively, which are secured to track assemblies mounted on the under side of the floor of the vehicle. The track assemblies enable movement of the seat to forward and rearward positions indicated by dotted lines 54 and 55 with the supports 51 and 52 moving in slots 53 formed in the floor construction. It will be observed that seat 50 is illustrated as a nonfoldable seat. The seat slide structure of this invention is, however, usable with both foldable and nonfoldable seats for supporting the seat in a desired position of adjustment forwardly and rearwardly of the vehicle.

Referring now to Figs. 2 and 3, there is shown one form of the adjustable sliding seat support of my invention. The assembly comprises a bottom track member 120 adapted to be attached to the floor of the automobile at holes 121, and a top movable track member 122 adapted to be attached to the seat supports by screws through holes 123. Large balls 124 and 125 are interposed between the two track members and roll in grooved raceways 126 in the top track and 127 in the bottom track. As is best shown in Figure 6, the raceways are formed of planar rather than curvilinear surfaces. It will be noted that by means of this construction the balls make point contact with the raceways which allows for variations in manufacture of the parts.

The two track members are held in transverse relation by flanges 128 on the top track which interlock with flanges 129 on the bottom track and balls 130 which are interposed therebetween. These flanges are planar and parallel which allows the balls 130 to wander laterally, and makes for easier manufacturing of the track member in contrast with the usual practice of grooved cylindrical raceways where the ball must fit perfectly in a curved line contact. The small balls 130 are used in groups of three and are held together by the retainer 131. This construction is desirable to distribute the great upwardly vertical stress occasioned when a passenger pushes rearwardly on the back of the seat or when the driver applies pressure to the brake pedal.

A locking plate 132 is welded to the top track 122, at the central portion thereof and has a series of spaced locking holes 133 arranged longitudinally thereof. Longitudinal movement of the top track relative to the bottom track is restricted by the flanged end 134 of the locking plate which contacts ball 125 when the ball abuts against stop 135 formed in the bottom track. A similar arrangement at the opposite end of the tracks limits the movement in the opposite direction. In addition the locking plate 132 adds considerable strength to the top track member by forming a closed cross section in the central portion of that member.

Stops 136 are formed in the bottom track and an equal number of correspondingly spaced stops 137 are formed in the top track as shown in Fig. 3. These stops obviate any possibility of the balls 130 falling out of their raceways.

As is shown in Fig. 5, the assembly of the two track members 120 and 122, and the balls 124, 125 and 130 is accomplished by first moving the track members to the approximate relation shown and since there are no balls between them, sufficient clearance is provided between the flanges 128 and 129 so that one group of three balls 130 may be inserted over the stop 137 in the bottom track and adjacent to but not beyond stop 136 in the flange of the top track. In similar manner a second group of three balls 130 is inserted on the other side. Then large ball 125 is pushed up through hole 150 and up the inclined way 151 in the direction of the arrow, thereby raising the top track 122 and securing the small balls 130 between the stops 136 and 137. The top track is then moved to the extreme end position shown in Fig. 4 so that ball 125 is against stop 135. The operation is repeated for the opposite end of the assembly and the balls are thus inserted. Set screws 152 are provided adjacent holes 150 to prevent the large balls from falling out of their respective raceways.

Mounted on the underside of the bottom track at the central portion thereof is a solenoid unit 145 which comprises an outer casing 139 enclosing a coil 140 connected to the battery circuit by leads 141 and 142. Within coil 140 there is retained a core 144 and a slidable plunger 146 which projects through a guide bushing 147 and is adapted to engage any of a plurality of spaced holes 133 in locking plate 132. The plunger is urged in an upward direction by a coil spring 148 which abuts against flange 149 secured to the plunger.

When electric current flows through coil 140 a magnetic field is created and moves the plunger downwardly out from the hole 133 thereby unlocking the top track member 122 and allowing the seat to be moved in either direction. When the electric current is interrupted, the coil 140 is deenergized and the magnetic field is dissipated, and the plunger 146 is moved by the spring 148 upwardly into engagement with any one of the holes 133 in registry with the plunger.

As shown in Fig. 1, the two sliding support assemblies are widely separated and each is provided with a solenoid unit 145. These two solenoids are connected by wiring (not shown) to the car battery and to a control button 170 preferably located on the instrument panel where it is easily accessible to the driver for adjustment of the seat forwardly or rearwardly relative to the steering wheel and controls.

In seat slides as heretofore constructed, where it is necessary to lock both remotely separated slides, this has been done with tie rods and bell cranks, the arrangement of which is usually complicated by the necessity of clearing the tunnel in the center of the floor. Due to variations in assembly, the locks on both sides do not always lock positively and simultaneously, resulting in a dangerous condition. In addition, such an arrangement usually necessitates locating the operating lever very low on the side of the seat where it is not readily accessible and requires groping to find. Location on the side of the seat necessitates clearance of approximately 2 inches between seat and door on both sides of the car and results in a loss of about 4 inches in seat width.

In my construction where electro magnetic solenoids are used, locking and unlocking of both sides is positive and simultaneous, and there is nothing to interfere with the tunnel or other units near the floor of the car, and the control button may be located at any desirable place.

My seat slides are readily adaptable for use in moving the entire front seat for entering or leaving a two door automobile. For this application, it is desirable to add a button switch on both the right and left hand upper corners of the seat as at 171 and 172, in Fig. 1 so that either of the buttons may be pressed and the seat moved with one hand. For safety reasons switches 171 and 172 should be inoperative when the car is moving. Accordingly, door switches 173 are provided and connected in the electric circuit as shown in the wiring diagram in Fig. 13.

As is shown by Fig. 13 the door switches 173 are open when the doors are closed, and the button switches 171 and 172 on the back of the seat are inoperative and cannot be inadvertently operated by anyone in the car. If either one or both of the doors are open, then one or both of the door switches 173 are closed, and the seat may be unlocked for moving by pressing either of the buttons 171 or 172. It will be noted that the door switches 173 have no effect on the driver's button 170 and he may adjust the seat at any time regardless of whether the doors are open or closed.

It will be realized, of course, that other structures incorporating a solenoid locking arrangement are possible. In Figs. 8 through 12 I have shown a similar slide track structure which is provided with another form of solenoid locking means. In this arrangement the lower track 120 is provided with a downwardly disposed flange portion 159 to which the solenoid unit 160 is secured. The plunger 161 of the solenoid is adapted to engage a locking pawl 153 which is pivotally mounted on each side of the lower track as at 154 in the same horizontal plane as the locking plate 132. A locking pin 155 on the free end of the pawl 153 is adapted to engage any of holes 133 in the locking plate and is biased to the locking position by a leaf-spring 157 which is secured to the lower track as at 156. A pin 162 at the upper end of plunger 161 engages the top face of pawl 153 and pivots the pawl downwardly to disengage locking pin 155 from its associated hole 133 when the solenoid is energized.

It will be observed that by pivoting the locking pawl 153 in the horizontal plane of the locking plate 132, no moment arm is produced in the pawl when the upper track is stressed in a longitudinal direction and consequently there is not chance for the pawl 153 to be moved inadvertently from the locked position. Pawl 153 may be provided with a handle portion 158 which may be used to manually retract the locking pin 155 if desired.

Thus it will be seen that the seat track of my invention together with the electrically actuated locking means provide a convenient and reliable means for adjusting the seat forwardly or rearwardly to the desired position. The tracks operate very smoothly with a minimum of friction and can be manufactured economically. The locking arrangement is positive in its action and tends to eliminate sloppiness and movement of the seat in the locked condition.

This application is a division of my copending application Serial No. 705,390, filed October 24, 1946, which application was abandoned in favor of continuing application Serial No. 277,231, filed March 18, 1952, now Patent No. 2,672,923, dated March 23, 1954.

I claim:

1. In an adjustable seat support of the type having a pair of interengaged track members arranged for relative longitudinal movement, means for releasably locking said track members to prevent relative movement thereof comprising spaced steps in one of said tracks, a yoked pawl pivotally connected to both sides of the other track member, said pawl being spring biased into engagement with said spaced steps, a plunger type solenoid arranged to actuate said pawl against the tension of said spring, and means for energizing said solenoid and thereby disengage said pawl from said steps to permit relative movement of said tracks.

2. An adjustable support for vehicle seats comprising a pair of interengaged track members having antifriction rolling elements interposed therebetween to permit relative longitudinal movement of said tracks, a locking plate secured to one of said tracks having spaced steps therein along the axis of longitudinal movement, a locking pawl pivotally connected to each side of the other track on a transverse axis which intersects and lies in the same plane as the longitudinal axis of said steps, the free end of said pawl being adapted to releasably engage said steps in said plane and means for pivoting said pawl into and out of engagement with said steps whereby forces tending to move one track relative to the other along said axis of longitudinal movement produce no resultant force tending to twist or move said free end of said pawl from engagement with said steps.

3. In an adjustable seat support, two generally channel-shaped interengaged track members arranged for relative longitudinal movement, each of said tracks having a longitudinally grooved base cooperating to form a grooved raceway between said tracks, anti-friction rolling elements disposed in said grooved raceway, the two sides of each track terminating in lateral flanges, the lateral flanges of one track projecting outwardly and disposed within and between inwardly projecting flanges on the other track to form two parallel flanged raceways, and anti-friction rolling elements interposed between each opposing set of flanges, said grooved raceway being provided with steps at each end of one track and stops in the central portion of the other track thereby forming two sectional grooved raceways with one or more rolling elements in each section thereof, the base of one track having a clearance hole adjacent the inner end of each grooved section adapted for insertion of said rolling elements, each of said flanged raceways being similarly provided with stops in each flange to form two sectional flanged raceways, whereby said tracks may be assembled by first inserting said rolling elements in each of said flanged raceways and then inserting rolling elements through said clearance holes into each of said grooved raceways and thereby hold said track members in constant transverse relation and permit relative longitudinal movement limited by said stops in said raceways.

4. In a vehicle adjustable support for the vehicle seat comprising a pair of interengaged track members having antifriction rolling elements interposed therebetween to permit relative longitudinal movement of said track members one of said tracks being fixed on a stationary support on the vehicle and the other being secured to the vehicle seat so that the seat is adjustably movable on said vehicle support, means on said movable track forming a locking plate having a plurality of spaced steps therein extending in the direction of longitudinal movement of said seat, a locking pawl pivotally connected to the fixed track on an axis which intersects and lies in the same plane as the longitudinal axis of said spaced steps, the free end of said pawl being adapted to swing upwardly to releasably engage said steps in said plane and means fixed on a stationary part of the vehicle for pivoting said pawl into and out of engagement with said steps.

5. The combination called for in claim 4 wherein said last mentioned means comprise an electro-magnet postioned below said pawl and having a generally vertically movable armature member connected with said pawl intermediate the free end of said pawl and said pivotal connection.

References Cited in the file of this patent

UNITED STATES PATENTS

| | | |
|---|---|---|
| 2,285,616 | Saunders et al. | June 9, 1942 |
| 2,307,305 | Sanders | Jan. 5, 1943 |
| 2,417,523 | Simpson | Mar. 18, 1947 |
| 2,441,913 | Taylor | May 18, 1948 |
| 2,579,599 | Moroney | Dec. 25, 1951 |
| 2,605,819 | Le Tourneau | Aug. 5, 1952 |
| 2,648,108 | Rappl | July 20, 1954 |

FOREIGN PATENTS

| | | |
|---|---|---|
| 438,083 | Great Britain | Nov. 11, 1935 |